(12) United States Patent
Park et al.

(10) Patent No.: US 9,698,846 B2
(45) Date of Patent: Jul. 4, 2017

(54) MOBILE COMMUNICATION TERMINAL FOR DECREASING SAR VALUE AND METHOD OF CONTROLLING THE SAME

(71) Applicant: Samsung Electronics Co., Ltd., Suwon-si, Gyeonggi-do (KR)

(72) Inventors: Soo-Pyoung Park, Seoul (KR); Yong-Yi Kim, Suwon-si (KR); Jea-Dong Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/196,421

(22) Filed: Mar. 4, 2014

(65) Prior Publication Data

US 2014/0256378 A1  Sep. 11, 2014

(30) Foreign Application Priority Data

Mar. 8, 2013 (KR) ........................ 10-2013-0024993

(51) Int. Cl.
| | |
|---|---|
| H04M 1/00 | (2006.01) |
| H04B 1/3827 | (2015.01) |
| H04B 7/0404 | (2017.01) |
| H04B 7/0426 | (2017.01) |
| H04W 52/36 | (2009.01) |
| H04W 52/42 | (2009.01) |
| H04W 88/06 | (2009.01) |

(52) U.S. Cl.
CPC ......... *H04B 1/3838* (2013.01); *H04B 7/0404* (2013.01); *H04B 7/0426* (2013.01); *H04W 52/367* (2013.01); *H04W 52/42* (2013.01); *H04W 88/06* (2013.01)

(58) Field of Classification Search
CPC .. H04B 1/3838; H04B 7/0404; H04B 7/0426; H04W 52/367
USPC ........................................ 455/552.1; 370/338
See application file for complete search history.

(56) References Cited

U.S. PATENT DOCUMENTS

| | | | |
|---|---|---|---|
| 8,345,797 B1 * | 1/2013 | Palanivelu et al. ........... | 375/299 |
| 2007/0111681 A1 * | 5/2007 | Alberth, Jr. .......... | H04B 1/3838 |
| | | | 455/127.1 |
| 2009/0047998 A1 * | 2/2009 | Alberth, Jr. ................ | 455/562.1 |
| 2011/0159914 A1 * | 6/2011 | Chen et al. .................... | 455/522 |
| 2014/0045543 A1 * | 2/2014 | Ishii et al. .................... | 455/522 |
| 2014/0213192 A1 * | 7/2014 | Lagnado ........... | H04W 52/0254 |
| | | | 455/67.11 |

FOREIGN PATENT DOCUMENTS

KR  10-1069320 B1  10/2011

\* cited by examiner

*Primary Examiner* — Marcos Batista
(74) *Attorney, Agent, or Firm* — Jefferson IP Law, LLP

(57) ABSTRACT

A method of controlling a mobile communication terminal including a first antenna and a second antenna is provided. The method includes receiving transmission data to be transmitted, applying first power smaller than a first threshold value to the first antenna, applying second power smaller than the first threshold value to the second antenna, and cooperatively transmitting the transmission data based on the first power and the second power, respectively, by the first antenna and the second antenna, wherein a sum of the first power and the second power is larger than a second threshold value.

16 Claims, 11 Drawing Sheets

MOBILE COMMUNICATION TERMINAL FOR DECREASING SAR VALUE AND METHOD OF CONTROLLING THE SAME

CROSS-REFERENCE TO RELATED APPLICATION(S)

This application claims the benefit under 35 U.S.C. §119 (a) of a Korean patent application filed on Mar. 8, 2013 in the Korean Intellectual Property Office and assigned Serial. number. 10-2013-0024993, the entire disclosure of which is hereby incorporated by reference.

TECHNICAL FIELD

The present disclosure relates to a mobile communication terminal for decreasing a Specific Absorption Rate (SAR) value and a control method thereof More particularly, the present disclosure relates to a mobile communication terminal including a plurality of antennas for decreasing an SAR value and a control method thereof

BACKGROUND

A mobile communication terminal can transmit an electromagnetic wave for data transmission/reception with a base station. However, the electromagnetic wave radiating from the mobile communication terminal may exert a harmful influence on the human body and thus, several domestic and foreign institutions have attempted to restrict the electromagnetic wave exerting the harmful influence on the human body. For example, the Specific Absorption Rate (SAR) is a value representing how much the electromagnetic wave radiating from the mobile communication terminal is absorbed into the human body. The SAR uses a unit of W/g, which indicates an amount of absorbed power (W) per one gram of the human body.

As the electromagnetic wave harmful to the human body emerged as an issue, the SAR limiting criteria for the mobile communication terminal was established.

To decrease the SAR value, a mobile communication terminal of the related art has introduced a technology for orienting beams away from the human body through adjustment of antenna beam patterns, a technology for locating antennas within a mobile communication terminal, and a technology for mounting an electromagnetic wave attenuator.

Further, for optimization of Transmission signal (TX signal) performance, a mobile communication terminal of the related art determines a power level in correspondence to an electric field situation and radiates a transmission signal with maximum power at a power level suitable for the electric field within a range satisfying the 3rd Generation Partnership Project (3GPP) standards.

For example, a recent mobile communication terminal employs a grip sensor and decreases the SAR value in such a way of reducing the strength of the radiated electromagnetic wave while the grip sensor is in use. However, the mobile communication terminal employing the grip sensor has a problem in that the strength of the transmission signal is so low that communication performance is degraded while the grip sensor is operating. Accordingly, a need exists for an improved apparatus and method for decreasing a SAR value without decreasing transmission performance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile communication terminal and a control method thereof, which can decrease a Specific Absorption Rate (SAR) value without transmission performance degradation by using a plurality of antennas.

In accordance with an aspect of the present disclosure, a method of controlling a mobile communication terminal including a first antenna and a second antenna is provided. The method includes receiving transmission data to be transmitted, applying first power smaller than a first threshold value to the first antenna, applying second power smaller than the first threshold value to the second antenna, and cooperatively transmitting the transmission data based on the first power and the second power, respectively, by the first antenna and the second antenna, wherein a sum of the first power and the second power is larger than a second threshold value.

In accordance with another aspect of the present disclosure, a mobile communication terminal for transmitting a transmission signal to an outside is provided. The mobile communication terminal includes a first antenna and a second antenna configured to cooperatively transmit the transmission signal, a control chip configured to receive transmission data to be transmitted, to apply first power smaller than a first threshold value to the first antenna, and to apply second power smaller than the first threshold value to the second antenna, a transceiver configured to receive the transmission data from the control chip and to amplify the received transmission data, and a first modulator and a second modulator configured to modulate the transmission data input from the transceiver and output the modulated transmission data to the first antenna and the second antenna, respectively, wherein a sum of the first power and the second power is larger than a second threshold value.

In accordance with another aspect of the present disclosure, a method of controlling a mobile communication terminal including a plurality of antennas is provided. The method includes receiving transmission data to be transmitted, applying power smaller than a first threshold value to the plurality of antennas, and cooperatively transmitting, by the plurality of antennas, the transmission data based on the power applied to the plurality of antennas, wherein a sum of the power applied to the plurality of antennas is larger than a second threshold value.

In accordance with another aspect of the present disclosure, a computer readable medium for storing an algorithm for scheduling of power applied to a plurality of antennas is provided. The algorithm includes generating a power scheduling algorithm for the scheduling of the power applied to the plurality of antennas, determining whether the power applied to the plurality of antennas is smaller than a first threshold value, determining whether a sum of the power applied to the plurality of antennas is larger than a second threshold value, and storing the generated power scheduling algorithm when the power applied to the plurality of antennas is smaller than the first threshold value and the sum of the power applied to the plurality of antennas is larger than the second threshold value.

As described above, embodiments of the present disclosure may provide a mobile communication terminal and a control method thereof, which can decrease an SAR value by using a plurality of antennas. For example, the mobile communication terminal according to the present disclosure can decrease the SAR value without a grip sensor, thereby achieving easy manufacturing processes and reducing manufacturing costs. Further, the mobile communication terminal can maintain strength of a transmission signal at a predetermined level while decreasing the SAR value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Figure 1:
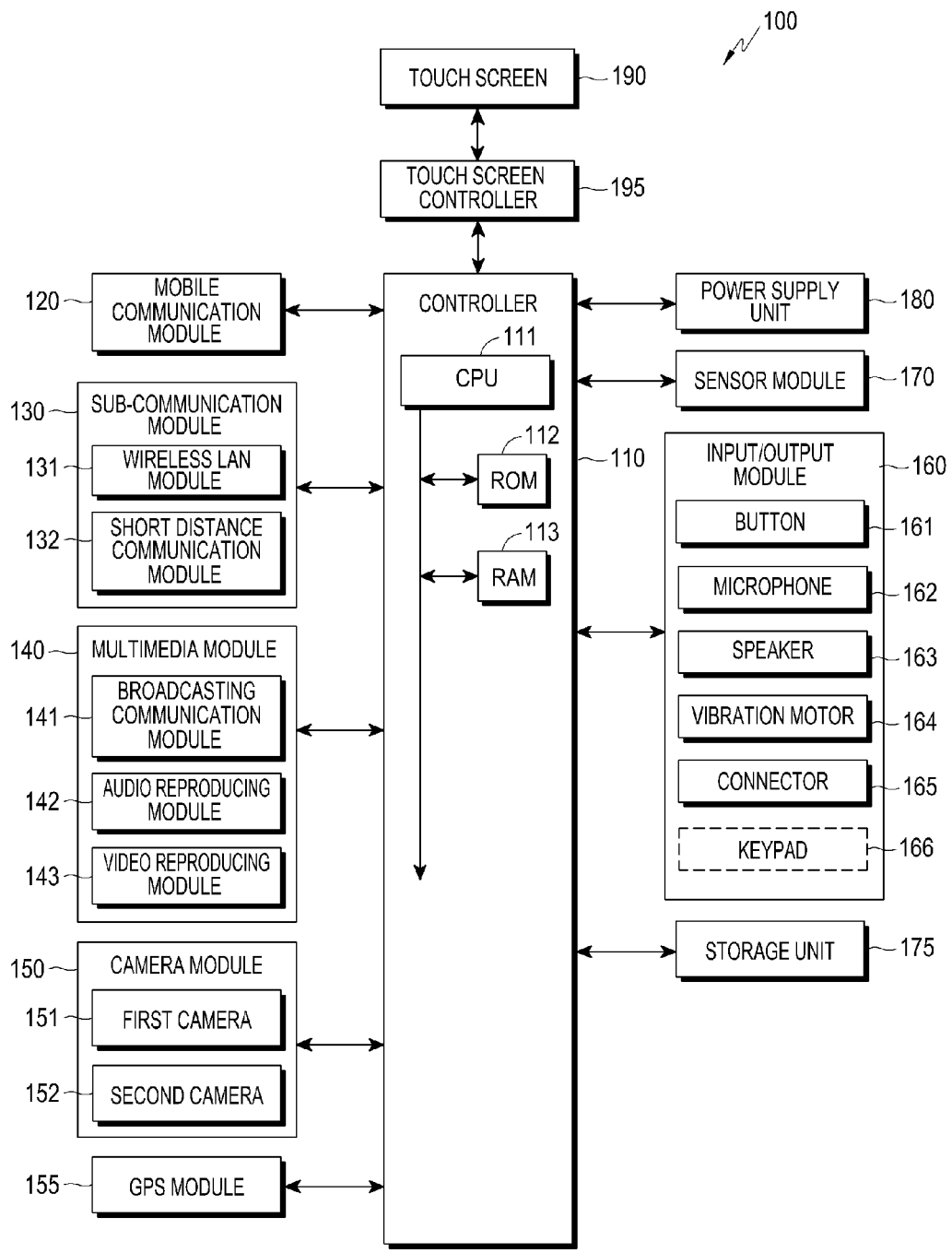
FIG. 1 is a block diagram schematically illustrating a device according to an embodiment of the present disclosure.

FIG. 1 is a block diagram schematically illustrating a device according to an embodiment of the present disclosure.

Referring to FIG. 1, a mobile communication terminal 100 may be connected with an external device (not illustrated) by using a mobile communication module 120, a sub-communication module 130, and a connector 165. The "external device" includes other devices (not illustrated), a mobile phone (not illustrated), a smart phone (not illustrated), a tablet Personal Computer (PC) (not illustrated), a server (not illustrated), and the like.

Referring to FIG. 1, the mobile communication terminal 100 includes a touch screen 190 and a touch screen controller 195. Further, the mobile communication terminal 100 includes a controller 110, the mobile communication module 120, the sub-communication module 130, a multimedia module 140, a camera module 150, a Global Positioning System (GPS) module 155, an input/output module 160, a sensor module 170, a storage unit 175, and a power supply unit 180. The sub-communication module 130 includes at least one of a wireless LAN module 131 and a short distance communication module 132, and the multimedia module 140 includes at least one of a broadcasting communication module 141, an audio reproducing module 142, and a video reproducing module 143. The camera module 150 includes at least one of a first camera 151 and a second camera 152. The input/output module 160 includes at least one of a button 161, a microphone 162, a speaker 163, a vibration motor 164, the connector 165, and a keypad 166.

The controller 110 may include a Central Processing Unit (CPU) 111, a Read Only Memory (ROM) 112 for storing control programs for control of the mobile communication terminal 100, and a Random Access Memory (RAM) 113 used as a storage area for storing a signal, for storing data input from the outside of the mobile communication terminal 100 or for storing work performed in the mobile communication terminal 100. The CPU 111 may include a single core, a dual core, a triple core, or a quad core. The CPU 111, the ROM 112 and the RAM 113 may be connected with each other through internal buses.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195. In an embodiment, the touch screen 190 may include a first touch screen and a second touch screen (not shown).

The mobile communication module 120 enables the mobile communication terminal 100 to be connected with an external device through mobile communication by using one antenna or a plurality of antennas (not illustrated) under the control of the controller 110. The mobile communication module 120 transmits/receives a wireless signal for a voice call, a video call, a Short Message Service (SMS), a Multimedia Message Service (MMS) and the like to/from a mobile phone (not illustrated) with phone numbers or other information input to the mobile communication terminal 100, a smart phone (not illustrated), a tablet PC or another device (not illustrated).

The sub-communication module 130 may include at least one of the wireless LAN module 131 and the short distance communication module 132. For example, the sub-communication module 130 may include only the wireless LAN module 131 or only the short distance communication module 132. Alternatively, the sub-communication module 130 may also include both the wireless LAN module 131 and the short distance communication module 132.

The wireless LAN module 131 may be connected to the Internet in a place where a wireless Access Point (AP) is installed under the control of the controller 110. The wireless LAN module 131 supports a wireless LAN standard (e.g., IEEE802.11x) of the Institute of Electrical and Electronics Engineers (IEEE). The short distance communication module 132 may wirelessly perform near field communication between the mobile communication terminal 100 and an image forming device (not illustrated) under the control of the controller 110. The short distance communication scheme may include, for example, Bluetooth, Infrared Data Association (IrDA) communication, and the like.

The mobile communication terminal 100 may include at least one of the mobile communication module 120, the wireless LAN module 131, and the short distance communication module 132 according to performance thereof For example, the mobile communication terminal 100 may include a combination of the mobile communication module 120, the wireless LAN module 131, and the short distance communication module 132 according to the performance thereof.

The multimedia module 140 may include the broadcasting communication module 141, the audio reproducing module 142 and the video reproducing module 143. The broadcasting communication module 141 may receive a broadcasting signal (e.g., a TV broadcasting signal, a radio broadcasting signal or a data broadcasting signal) or additional broadcasting information (e.g., Electric Program Guide (EPG) or Electric Service Guide (ESG)) which is transmitted from a broadcasting station through a broadcasting communication antenna (not illustrated) under the control of the controller 110. The audio reproducing module 142 may reproduce a stored or received digital audio file (e.g., a file having a file extension of mp3, wma, ogg, or way) under the control of the controller 110. The video reproducing module 143 may reproduce a stored or received digital video file (e.g., a file having a file extension of mpeg, mpg, mp4, avi, mov, or mkv) under the control of the controller 110. The video reproducing module 143 may reproduce a digital audio file.

The multimedia module 140 may include the audio reproducing module 142 and the video reproducing module 143 except for the broadcasting communication module 141. Also, the audio reproducing module 142 or the video reproducing module 143 of the multimedia module 140 may be included in the controller 110.

The camera module 150 may include at least one of the first camera 151 and the second camera 152, each of which photographs a still image or a moving image under the control of the controller 110. In addition, the first camera 151 or the second camera 152 may include an auxiliary light source (e.g., a flash (not illustrated)) that provides an amount of light required for photographing. The first camera 151 may be disposed on a front surface of the mobile communication terminal 100 and the second camera 152 may be disposed on a rear surface of the mobile communication terminal 100. In a different embodiment, the first camera 151 and the second camera 152 may be disposed adjacent to each other (e.g., an interval between the first camera 151 and the second camera 152 is larger than 1 cm or smaller than 8 cm) to photograph a three-dimensional still image or a three-dimensional moving image.

The GPS module 155 may receive radio waves from a plurality of GPS satellites (not illustrated) in Earth's orbit, and may calculate a position of the mobile communication terminal 100 by using Time of Arrival of the radio waves to the mobile communication terminal 100 from the GPS satellites.

The input/output module 160 may include at least one of a plurality of buttons 161, a microphone 162, a speaker 163, a vibration motor 164, a connector 165, and a keypad 166.

The button 161 may include a plurality of buttons that may be formed on the front surface, side surfaces or the rear surface of the housing of the mobile communication terminal 100, and may include at least one of a power/lock button (not illustrated), a volume button (not illustrated), a menu button, a home button, a back button, a search button, and the like.

The microphone 162 receives a voice or a sound to generate an electrical signal under the control of the controller 110.

The speaker 163 may output sounds corresponding to various signals (e.g., a radio signal, a broadcasting signal, a digital audio file, a digital moving image file, or photographing) of the mobile communication module 120, the sub-communication module 130, the multimedia module 140, or the camera module 150 to the outside of the mobile communication terminal 100 under the control of the controller 110. The speaker 163 may output a sound corresponding to a function performed by the mobile communication terminal 100 (e.g., a button operation sound corresponding to a phone call or a call connection sound). One or more speakers 163 may be formed at a proper position or positions of the housing of the mobile communication terminal 100.

The vibration motor 164 may convert an electronic signal to mechanical vibration under the control of the controller 110. For example, the mobile communication terminal 100 in a vibration mode operates the vibration device 164 when a voice call is received from another device (not illustrated). One or more vibration motors 164 may be provided in the housing of the mobile communication terminal 100. The vibration motor 164 may operate in response to a user's touch action that touches the touch screen 190 and a continuous touch movement on the touch screen 190.

The connector 165 may be used as an interface which connects the mobile communication terminal 100 and an external device (not illustrated) or a power source (not illustrated). The mobile communication terminal 100 may transmit data stored in the storage unit 175 of the mobile communication terminal 100 to the external device (not illustrated) or receive data from an external device (not illustrated) through a wired cable connected to the connector 165 under the control of the controller 110. The mobile communication terminal 100 may receive power from the power source (not illustrated) through the wired cable connected to the connector 165 or charge a battery (not illustrated).

The keypad 166 may receive a key input from a user for control of the mobile communication terminal 100. The keypad 166 may include a physical keypad (not illustrated)

formed in the mobile communication terminal 100 or a virtual keypad (not illustrated) displayed on the touch screen 190. The physical keypad (not illustrated) formed in the mobile communication terminal 100 may be excluded according to performance or a structure of the mobile communication terminal 100.

The sensor module 170 includes at least one sensor for detecting a state of the mobile communication terminal 100. For example, the sensor module 170 may include a proximity sensor for detecting whether a user approaches the mobile communication terminal 100, an illumination sensor (not illustrated) for detecting an amount of ambient light of the mobile communication terminal 100, a motion sensor (not illustrated) for detecting a motion (e.g., rotation of the mobile communication terminal 100, acceleration or vibration applied to the mobile communication terminal 100) of the mobile communication terminal 100. At least one sensor may detect the state, and generate a signal corresponding to the detection to transmit the generated signal to the controller 110. The sensors of the sensor module 170 may be added or omitted according to the performance of the mobile communication terminal 100.

The storage unit 175 may store signals or data input/output to correspond to an operation of the mobile communication module 120, the sub-communication module 130, the multimedia module 140, the camera module 150, the GPS module 155, the input/output module 160, the sensor module 170, and the touch screen 190 under the control of the controller 110. The storage unit 175 may store control programs and applications for control of the mobile communication terminal 100 or the controller 110.

The term "storage unit" is used as a term which refers to a random data storage device such as the storage unit 175, the ROM 112 and the RAM 113 within the controller 110, or a memory card (not illustrated) (e.g., an SD card or a memory stick) mounted to the mobile communication terminal 100. The storage unit may include a non-volatile memory, a volatile memory, a Hard Disc Drive (HDD) or a Solid State Drive (SSD).

The power supply unit 180 may supply power to one or more batteries (not illustrated) disposed in the housing of the mobile communication terminal 100 under the control of the controller 110. The one or more batteries (not illustrated) supply power to the mobile communication terminal 100. In addition, the power supply unit 180 may supply power input from an external power source (not illustrated) through a wired cable connected with the connector 165 to the mobile communication terminal 100.

The touch screen 190 may provide a user interface corresponding to various services (e.g., phone communication, data transmission, broadcasting, photographing a picture, and the like) to a user. The touch screen 190 may transmit an analog signal corresponding to at least one touch input to the user interface to the touch screen controller 195. The touch screen 190 may receive at least one touch through a user's body part (e.g., fingers including a thumb) or a touchable input means (e.g., a stylus pen). Also, the touch screen 190 may receive a continuous movement of one touch among at least one touch. The touch screen 190 may transmit an analog signal corresponding to the continuous movement of the touch input thereto to the touch screen controller 195.

In an embodiment, the touch is not limited to contact between the touch screen 190 and a user's body part or a touchable input means, but may include non-contact (e.g., a case where a detectable interval between the touch screen 190 and the user's body part or the touchable input means is equal to or smaller than 1 mm). The detectable interval of the touch screen 190 may vary depending on the performance or structure of the mobile communication terminal 100.

The touch screen 190 may be implemented in, for example, a resistive type, a capacitive type, an infrared type, or an acoustic wave type.

The touch screen controller 195 converts the analog signal received from the touch screen 190 to a digital signal (e.g., X and Y coordinates) and transmits the digital signal to the controller 110. The controller 110 may control the touch screen 190 by using the digital signal received from the touch screen controller 195. For example, the controller 110 may cause a shortcut icon (not illustrated) displayed on the touch screen 190 to be selected or may execute the shortcut icon (not illustrated) in response to a touch. Further, the touch screen controller 195 may be included in the controller 110.

Figure 2:
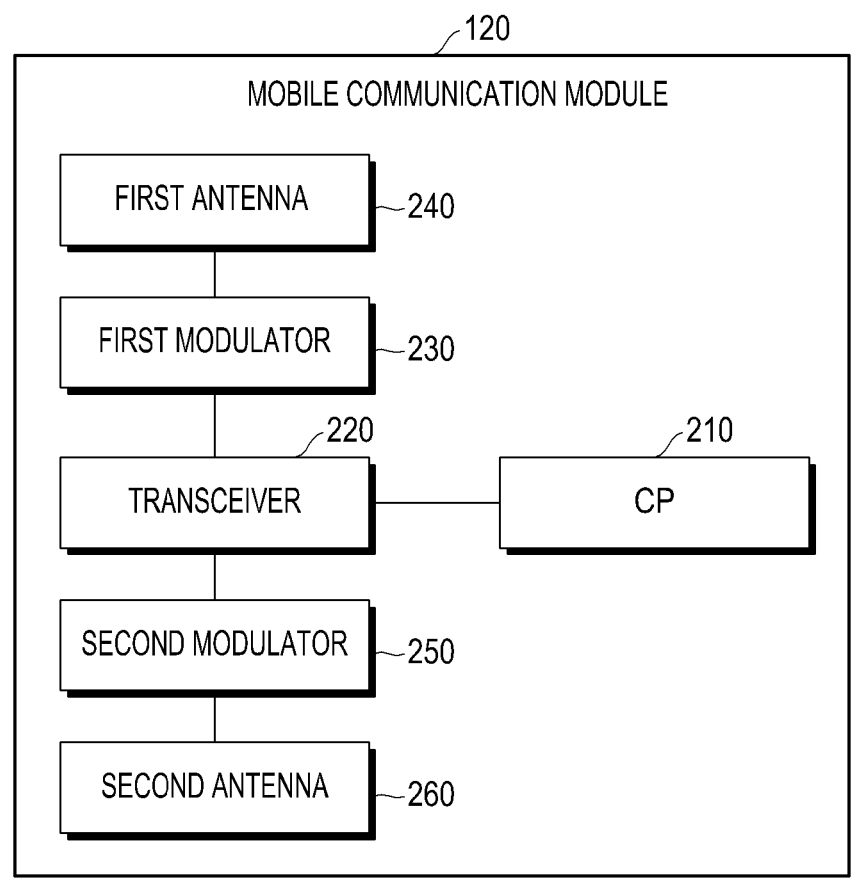
FIG. 2 is a block diagram of a mobile communication module according to an embodiment of the present disclosure.

FIG. 2 is a block diagram of a mobile communication module according to an embodiment of the present disclosure.

Referring to FIG. 2, the mobile communication module 120 may include a Control chiP (CP) 210, a transceiver 220, a first modulator 230, a first antenna 240, a second modulator 250, and a second antenna 260. Here, the CP 210 may receive transmission data input from, for example, the controller 110 of FIG. 1. The CP 210 may output the input transmission data to the transceiver 220.

The transceiver 220 may control transmission of the input transmission data through the first antenna 240 or the second antenna 260, or may process a signal received by the first antenna 240 or the second antenna 260. The transceiver 220 may perform antenna control such as a determination or an adjustment of transmission or reception durations of the first antenna 240 or the second antenna 260. The transceiver 220 may also perform amplification of the transmission signal or filtering of the received signal. The transceiver 220 may be implemented in various modes such as a full-duplex mode or a half-duplex mode, and it will be understood by those skilled in the art that there is no limit to the mode.

The first modulator 230 may modulate the transmission data input from the transceiver 220 to output the modulated data to the first antenna 240. In addition, the second modulator 250 may modulate the transmission data input from the transceiver 220 to output the modulated data to the second antenna 260.

The first and second modulators 230 and 250 may generate a transmission signal by modulating the transmission data based on various methods including, for example, Amplitude Modulation (AM), Frequency Modulation (FM), Phase Modulation (PM), Amplitude-Shift Keying (ASK), Frequency-Shift Keying (FSK), Phase-Shift Keying (PSK), Quadrature Amplitude Modulation (QAM), Continuous Phase Modulation (CPM), Trellis Coded Modulation (TCM), Pulse-Code Modulation (PCM), Pulse-Width Modulation (PWM), Pulse-Amplitude Modulation (PAM), Pulse-Position Modulation (PPM), Pulse-Density Modulation (PDM), and the like, and may output the generated transmission signal to the first antenna 240 and the second antenna 260. Meanwhile, the transmission signal that is generated by the first modulator 230 and output to the first antenna 240 is referred to as a first transmission signal, and the transmission signal that is generated by the second modulator 250 and output to the second antenna 260 is referred to as a second transmission signal.

The first antenna 240 may transmit the first transmission signal, and the second antenna 260 may transmit the second transmission signal. Here, the first and second transmission signals are not independent transmission signals, and may be cooperative transmission signals for transmitting one transmission data. Namely, the first antenna 240 and the second antenna 260 may be Multiple Input Multiple Output (MIMO) antennas. The mobile communication module 120 may include the MIMO antennas 240 and 260 in contrast to the conventional mobile communication terminal having Single Input Multiple Output (SIMO) antennas. The first and second antennas 240 and 260 may be disposed to be spaced a distance of d apart from each other. Meanwhile, it will be understood by those skilled in the art that strength of a transmission signal to be transmitted may be maintained at the same level in terms of the mobile communication terminal even when the MIMO antennas are employed.

The CP 210 may schedule and control power applied to the first and second antennas 240 and 260. For example, the CP 210 may apply first power to the first antenna 240 and second power to the second antenna 260. The first antenna 240 may transmit the first transmission signal based on the applied first power, and the second antenna 260 may transmit the second transmission signal based on the applied second power.

The first antenna 240 may generate a first Specific Absorption Rate (SAR) value, while transmitting the first transmission signal based on the first power. In addition, the second antenna 260 may generate a second SAR value, while transmitting the second transmission signal based on the second power. Meanwhile, when third power is applied to a single antenna for comparison with the present disclosure, an SAR generated by a third transmission signal is referred to as a third SAR. Further, it is assumed that the transmission signal to be transmitted by cooperative transmission of the first and second transmission signals has the same strength as the third transmission signal. Namely, the transmission signal may be transmitted, while being maintained at the same strength as the third transmission signal by the cooperative transmission of the first and second antennas 240 and 260. Here, each of the first power and the second power may be smaller than the third power. Further, a sum of the first power and the second power may be larger than the third power.

As described above, the mobile communication module 120 may apply the first power smaller than a first threshold value to the first antenna 240, and may apply the first power smaller than the first threshold value to the second antenna 260. Here, the first threshold value may be power through which, for example, a single antenna generates a specific SAR value, for example, 0.3 mW/g. Meanwhile, the mobile communication module 120 may maintain the sum of the first and second power larger than a second threshold value. Here, the second threshold value may be power through which the single antenna generates a transmission single having specific strength. Accordingly, the mobile communication module 120 of the present disclosure can reduce the SAR value, while maintaining the strength of the transmission signal at the specific level. Meanwhile, as will be described below, the mobile communication module 120 may schedule the applied power such that the power having time dependent strength but not constant strength is applied to the antenna, in which case the maximum value of the varying power may also be larger than the first threshold value. In addition, a sum of power applied to a plurality of antennas may be maintained to be smaller than the second threshold value.

Meanwhile, it will be understood by those skilled in the art that the mobile communication module 120 including two antennas as illustrated in FIG. 2 is only illustrative, and the mobile communication module 120 may include a plurality of antennas without limitation of the number of antennas and may be implemented by the same spirit of the present disclosure.

Figure 3:
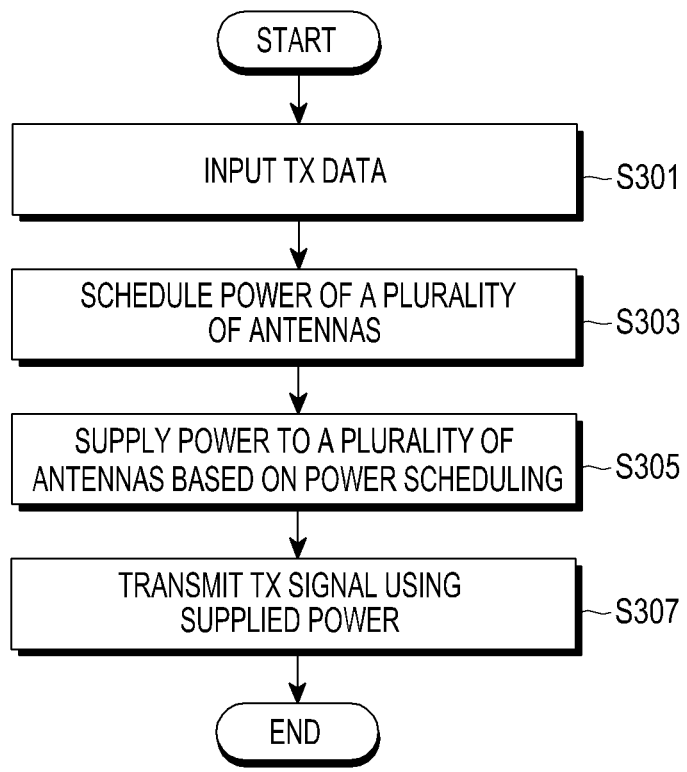
FIG. 3 is a flowchart illustrating a method of controlling a mobile communication terminal according to an embodiment of the present disclosure.

FIG. 3 is a flowchart illustrating a method of controlling a mobile communication terminal according to an embodiment of the present disclosure. Here, the mobile communication terminal may include a plurality of antennas for cooperative transmission.

Referring to FIG. 3, the mobile communication terminal may receive transmission data in operation S301. For example, the mobile communication terminal may read out stored transmission data or may receive, from a user, data to be transmitted.

The mobile communication terminal may schedule power applied to a plurality of antennas in operation S303. For example, the mobile communication terminal may schedule the power applied to the plurality of antennas such that the strength of a transmission signal cooperatively transmitted from the plurality of antennas is larger than a certain magnitude and an SAR value generated by the transmission signal cooperatively transmitted from the plurality of antennas is smaller than a certain SAR value.

The mobile communication terminal may apply power to each of the plurality of antennas based on the power scheduling in operation S305. Each of the plurality of antennas of the mobile communication terminal may cooperatively transmit a transmission signal using the supplied power in operation S307.

Figure 4:
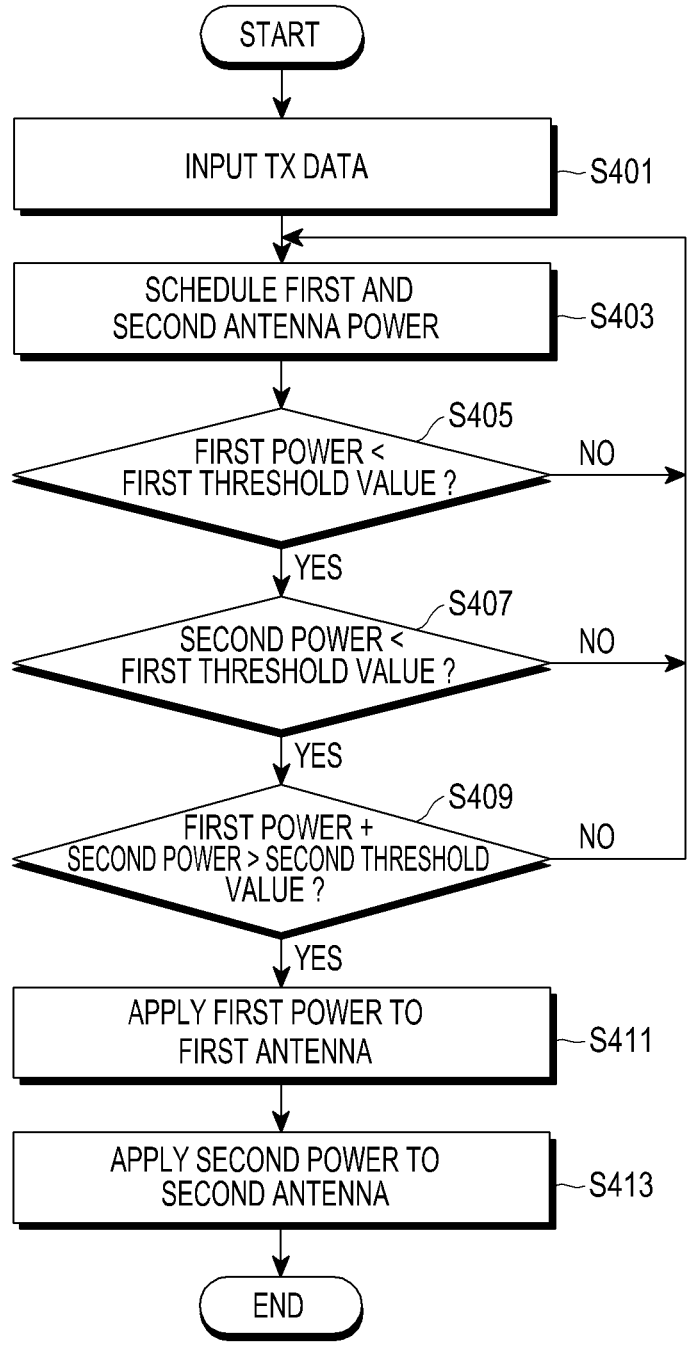
FIG. 4 is a flowchart illustrating operations of a mobile communication terminal according to an embodiment of the present disclosure.

FIG. 4 is a flowchart illustrating operations of a mobile communication terminal according to an embodiment of the present disclosure. The flowchart of FIG. 4 will be described in more detail with reference to the graph of FIG. 5 illustrating first power and second power.

Referring to FIG. 4, the mobile communication terminal may receive transmission data in operation S401. For example, the mobile communication terminal may read out stored transmission data or may receive, from a user, data to be transmitted.

The mobile communication terminal may schedule power applied to first and second antennas in operation S403. In more detail, the mobile communication terminal may perform the scheduling such that first power is applied to the first antenna and second power is applied to the second antenna.

Figure 5:
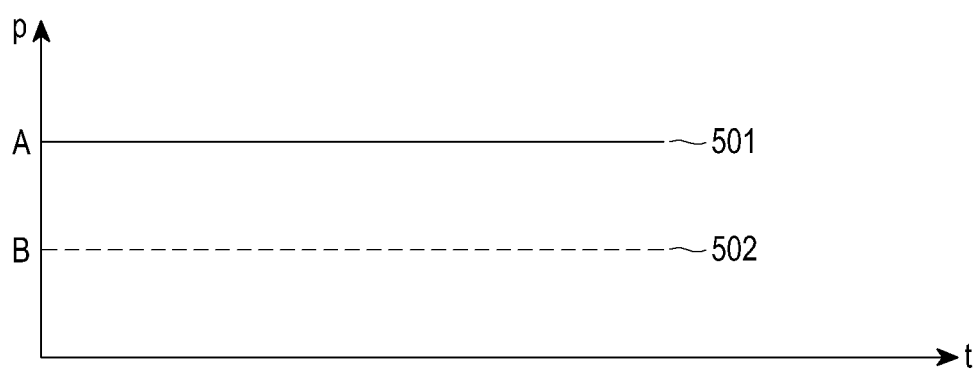
FIG. 5 is a graph illustrating first power and second power according to an embodiment of the present disclosure.

FIG. 5 is a graph illustrating first power and second power according to an embodiment of the present disclosure.

Referring to FIG. 5, the mobile communication terminal may schedule first power 501 having a value of A and second power 502 having a value of B. In the case of FIG. 5, the mobile communication terminal may perform scheduling of constantly maintaining the first power 501 as the value of A and the second power 502 as the value of B.

Referring again to FIG. 4, the mobile communication terminal may determine whether the first power is smaller than a first threshold value in operation S405. Here, the first threshold value may be a power value by which a single antenna generates a certain magnitude of SAR. When the first power is larger than or equal to the first threshold value (i.e., S405-N), the mobile communication terminal may again schedule the power applied to the first antenna in operation S403. Meanwhile, when it is determined that the first power is smaller than the first threshold value (i.e., S405-Y), the mobile communication terminal may determine whether the second power is smaller than the first threshold value in operation S407. When the second power is larger than or equal to the first threshold value (i.e., S407-N), the mobile communication terminal may again schedule the power applied to the second antenna in operation S403. Meanwhile, when it is determined that the second power is smaller than the first threshold value (i.e., S407-Y), the mobile communication terminal may determine whether a sum of the first power and the second power is larger than the second threshold value in operation S409. Here, the second threshold value may be a power value by which a single antenna may output certain transmission signal strength. When it is determined that the sum of the first power and the second power is smaller than or equal to the second threshold value (i.e., S409-N), the mobile communication terminal may again schedule at least one of the power applied to the first antenna and the second antenna, in operation S403.

When it is determined that the sum of the first power and the second power exceeds the second threshold value (i.e., S409-Y), the mobile communication terminal may apply the first power to the first antenna in operation S411, and may apply the second power to the second antenna in operation S413.

Figure 6:
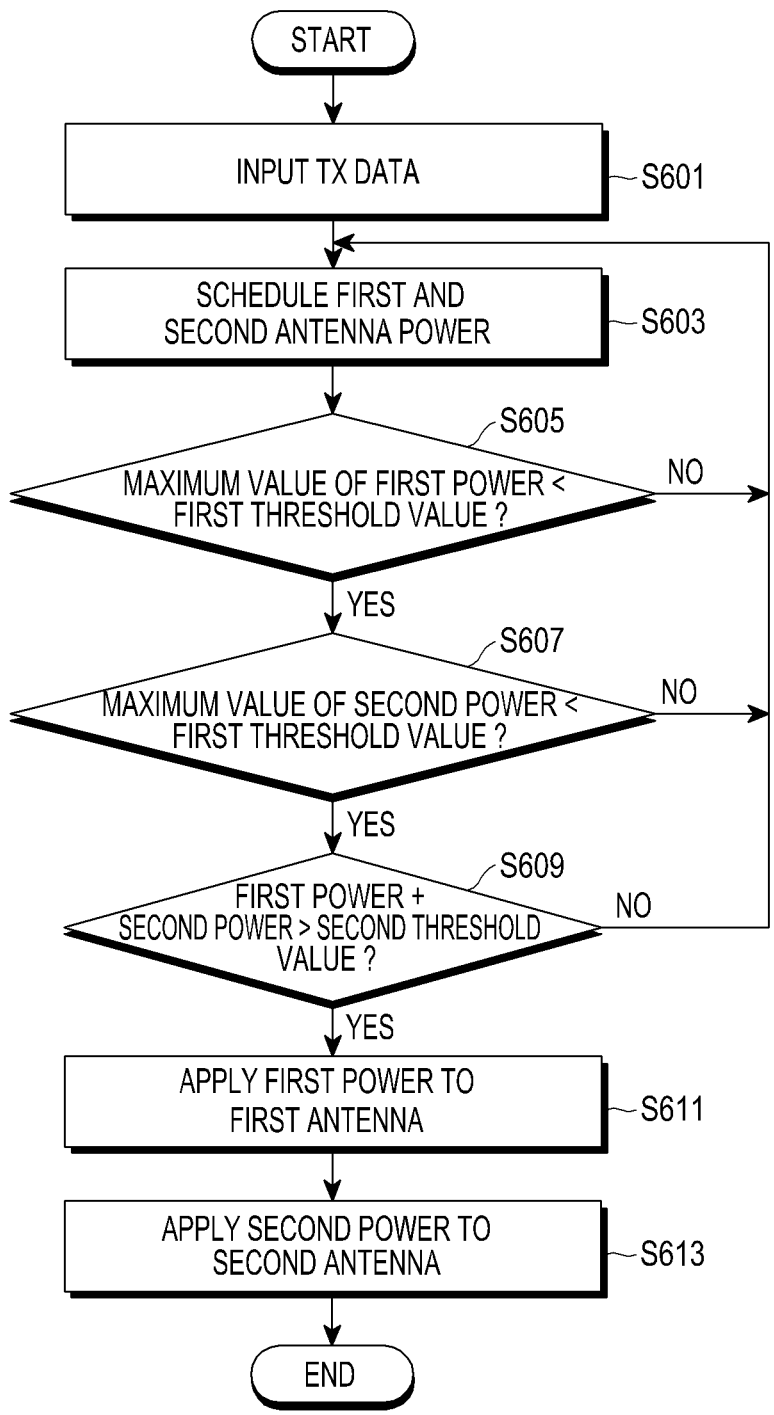
FIG. 6 is a flowchart illustrating a method of controlling a mobile communication terminal according to an embodiment of the present disclosure.

FIG. 6 is a flowchart illustrating a method of controlling a mobile communication terminal according to an embodiment of the present disclosure. The flowchart of FIG. 6 will be described in more detail with reference to the graph of FIG. 7 illustrating first power and second power.

Referring to FIG. 6, the mobile communication terminal may receive transmission data in operation S601. For example, the mobile communication terminal may read out stored transmission data or may receive, from a user, data to be transmitted.

The mobile communication terminal may schedule power applied to first and second antennas, in operation S603. In more detail, the mobile communication terminal may perform the scheduling such that first power varying depending on time is applied to the first antenna and second power varying depending on time is applied to the second antenna.

Figure 7:
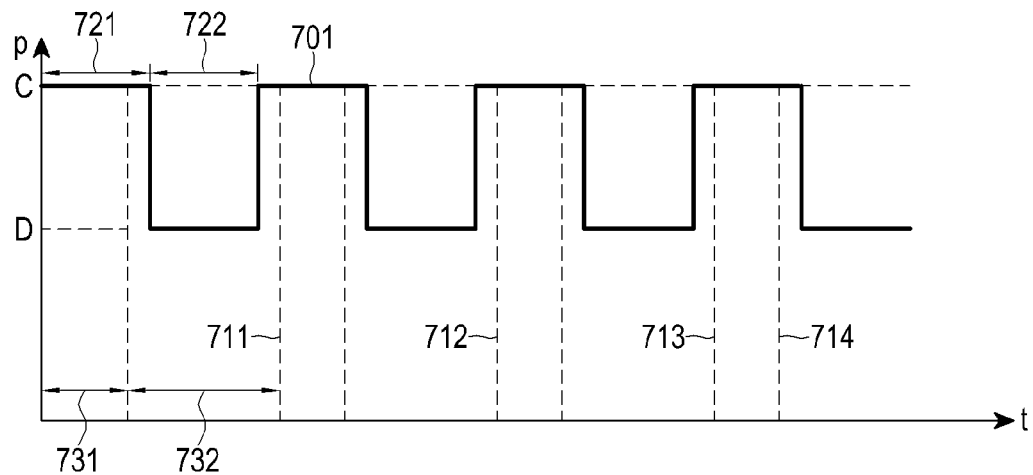
FIG. 7 is a graph illustrating first power and second power according to an embodiment of the present disclosure.

FIG. 7 is a graph illustrating first power and second power according to an embodiment of the present disclosure.

Referring to FIG. 7, the mobile communication terminal may schedule first power 701 having values of C and D, and second power 711, 712, 713 and 714 having the value of C and a value of zero. In the case of FIG. 7, the mobile communication terminal may perform scheduling of the first power 701 in which power having the value of C is applied for a first duration 721 and power having the value of D is applied for a second duration 722. The mobile communication terminal may periodically repeat the first power scheduling of the first and second durations 721 and 722.

In addition, the mobile communication terminal may perform scheduling of the second power 711, 712, 713, and 714 in which power is not applied for a third duration 731 and power having the value of C is applied for a fourth duration 732. The mobile communication terminal may periodically repeat the second power scheduling of the third and fourth durations 731 and 732.

Referring again to FIG. 6, the mobile communication terminal may determine whether the maximum value of the first power, namely, the value of C in FIG. 7 is smaller than a first threshold value in operation S605. Here, the first threshold value may be a power value by which a single antenna generates a certain magnitude of SAR. When the maximum value of the first power is larger than or equal to the first threshold value (i.e., S605-N), the mobile communication terminal may again schedule the power applied to the first antenna in operation S603. Meanwhile, when it is determined that the maximum value of the first power is smaller than the first threshold value (i.e., S605-Y), the mobile communication terminal may determine whether the maximum value of the second power, namely, the value of C in FIG. 7 is smaller than the first threshold value in operation S607. When the maximum value of the second power is larger than or equal to the first threshold value (i.e., S607-N), the mobile communication terminal may again schedule the power applied to the second antenna in operation S603. Meanwhile, when it is determined that the maximum value of the second power is smaller than the first threshold value (i.e., S607-Y), the mobile communication terminal may determine whether a sum of the first power and the second power is larger than the second threshold value in operation S609. In more detail, the mobile communication terminal may determine whether the sum of the first power and the second power for the same duration is larger than the second threshold value, in operation S609. Here, the second threshold value may be a power value by which a single antenna may output a certain transmission signal strength. When it is determined that the sum of the first power and the second power is smaller than or equal to the second threshold value (i.e., S609-N), the mobile communication terminal may again schedule at least one of the power applied to the first antenna and the second antenna in operation S603.

When it is determined that the sum of the first power and the second power exceeds the second threshold value (i.e., S609-Y), the mobile communication terminal may apply the first power to the first antenna in operation S611, and may apply the second power to the second antenna in operation S613.

FIGS. 8 to 11 are graphs of first power and second power according to various embodiments of the present disclosure.

Figure 8:
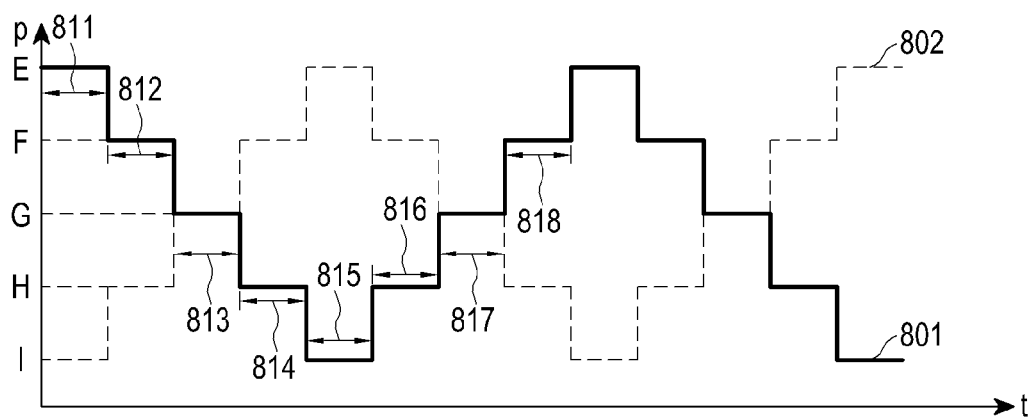
FIGS. 8, 9, 10, and 11 are graphs of first power and second power according to various embodiments of the present disclosure.

Referring to FIG. 8, a mobile communication terminal may perform scheduling of first power 801 in which power having a value of E is applied for a first duration 811, power having a value of F is applied for a second duration 812, power having a value of G is applied for a third duration 813, power having a value of H is applied for a fourth duration 814, power having a value of I is applied for a fifth duration 815, power having a value of H is applied for a sixth duration 816, power having a value of G is applied for a seventh duration 817, and power having a value of F is applied for an eighth duration 818. The mobile communication terminal may perform scheduling of second power 802 in which power having a value of I is applied for the first duration 811, power having a value of H is applied for the second duration 812, power having a value of G is applied for the third duration 813, power having a value of F is applied for the fourth duration 814, power having a value of E is applied for the fifth duration 815, power having a value of F is applied for the sixth duration 816, power having a value of G is applied for the seventh duration 817, and power having a value of H is applied for the eighth duration 818. Meanwhile, the mobile communication terminal may periodically repeat the first and second power applications of the first to eighth durations 811 to 818.

In addition, the mobile communication terminal may determine whether the maximum value E of the first power and the maximum value E of the second power are smaller than a first threshold value, and may apply the first power and the second power only when the maximum value E of the first power and the maximum value E of the second power are smaller than the first threshold value. In addition, the mobile communication terminal may determine whether a sum of the first power and the second power is larger than a second threshold value, and may apply the first power and the second power only when the sum of the first power and the second power is larger than the second threshold value.

Figure 9:
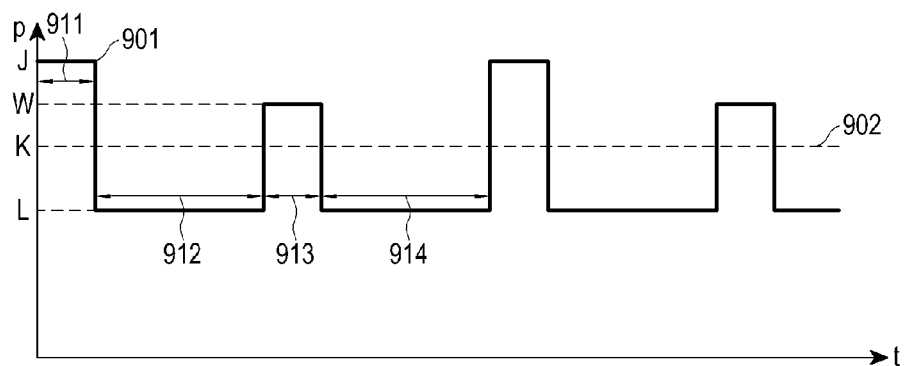

Referring to FIG. 9, a mobile communication terminal may perform scheduling of first power 901 in which power having a value of J is applied for a first duration 911, power having a value of L is applied for a second duration 912, power having a value of W is applied for a third duration 913, and power having a value of L is applied for a fourth duration 914. Meanwhile, the mobile communication terminal may periodically repeat the first power application of the first to fourth durations 911 to 914. The mobile communication terminal may perform scheduling of second power 902 in which power having a value of K is steadily applied.

In addition, the mobile communication terminal may determine whether the maximum value J of the first power and the value K of the second power are smaller than a first threshold value, and may apply the first power and the second power only when the maximum value J of the first power and the value K of the second power are smaller than the first threshold value. In addition, the mobile communication terminal may determine whether a sum of the first power and the second power is larger than a second threshold value, and may apply the first power and the second power only when the sum of the first power and the second power is larger than the second threshold value.

Figure 10:
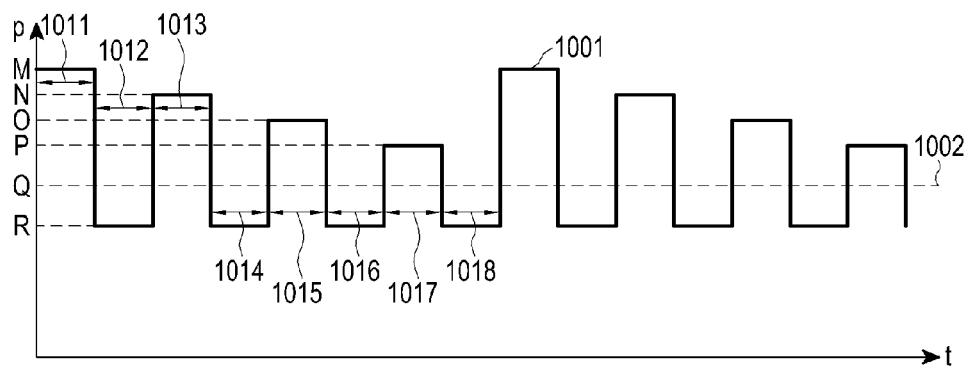

Referring to FIG. 10, a mobile communication terminal may perform scheduling of first power 1001 in which power having a value of M is applied for a first duration 1011, power having a value of R is applied for a second duration 1012, power having a value of N is applied for a third duration 1013, power having a value of R is applied for a fourth duration 1014, power having a value of O is applied for a fifth duration 1015, power having a value of R is applied for a sixth duration 1016, power having a value of P is applied for a seventh duration 1017, and power having a value of R is applied for an eighth duration 1018. Meanwhile, the mobile communication terminal may periodically repeat the first power application of the first to eighth durations 1 to 8.

The mobile communication terminal may perform scheduling of second power 1002 in which power having a value of Q is steadily applied.

In addition, the mobile communication terminal may determine whether the maximum value M of the first power and the value Q of the second power are smaller than a first threshold value, and may apply the first power and the second power only when the maximum value M of the first power and the value Q of the second power are smaller than the first threshold value. Further, the mobile communication terminal may determine whether a sum of the first power and the second power is larger than a second threshold value, and may apply the first power and the second power only when the sum of the first power and the second power is larger than the second threshold value.

Figure 11:
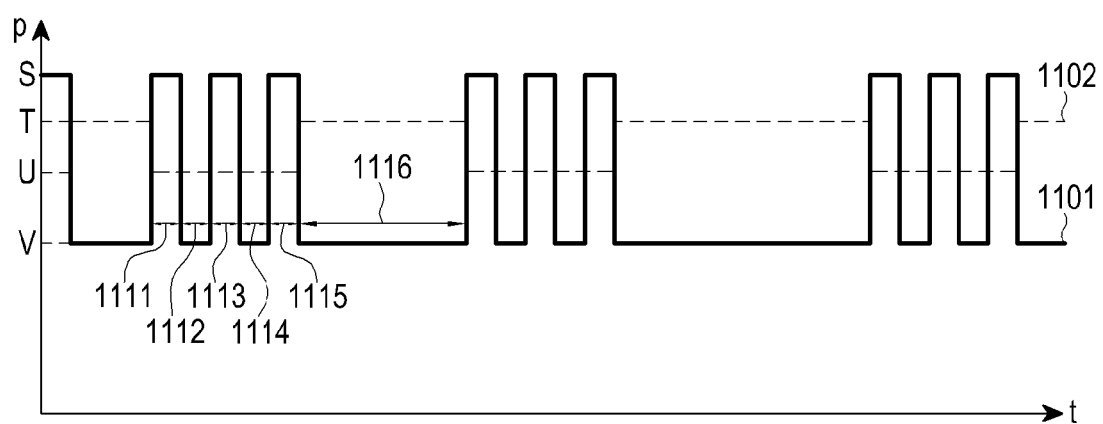

Referring to FIG. 11, a mobile communication terminal may perform scheduling of first power 1101 in which power having a value of S is applied for a first duration 1111, power having a value of V is applied for a second duration 1112, power having a value of S is applied for a third duration 1113, power having a value of V is applied for a fourth duration 1114, power having a value of S is applied for a fifth duration 1115, and power having a value of V is applied for a sixth duration 1116. The mobile communication terminal may perform scheduling of second power 1102 in which power having a value of U is applied for the first to fifth durations 1111 to 1115 and power having a value of T is applied for the sixth duration 1116. Meanwhile, the mobile communication terminal may periodically repeat the first and second power applications of the first to sixth durations 1 to 6.

In addition, the mobile communication terminal may determine whether the maximum value S of the first power and the maximum value T of the second power are smaller than a first threshold value, and may apply the first power and the second power only when the maximum value S of the first power and the maximum value T of the second power are smaller than the first threshold value. Further, the mobile communication terminal may determine whether a sum of the first power and the second power is larger than a second threshold value, and may apply the first power and the second power only when the sum of the first power and the second power is larger than the second threshold value.

As described above, the mobile communication terminal according to an embodiment of the present disclosure may schedule the various types of first and second power, and it will be understood by those skilled in the art that the scope of the present disclosure is not restricted by the scheduling scheme of the first and second power.

Figure 12A:
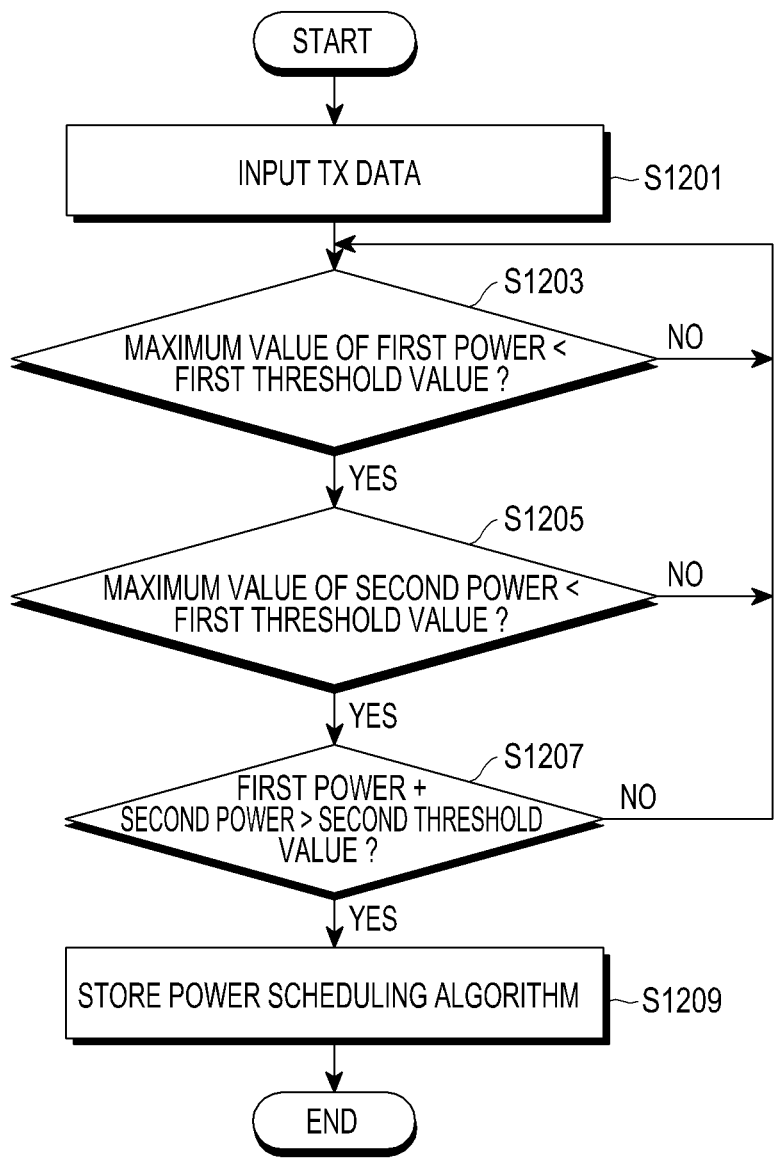
FIG. 12A is a flowchart for generating an algorithm according to an embodiment of the present disclosure.

FIG. 12A is a flowchart for generating an algorithm according to an embodiment of the present disclosure.

In an embodiment, the algorithm may be generated by an algorithm generator and the algorithm generator may be, for example, a computer used by a manufacturer of a mobile communication terminal for generation of an algorithm employed for the mobile communication terminal.

Referring to FIG. 12A, the algorithm generator may schedule first power and second power applied to a first antenna and a second antenna, respectively in operation S1201. In operation S1203, the algorithm generator may determine whether the maximum value of the first power is smaller than a first threshold value, determine in operation S1205 whether the maximum value of the second power is smaller than the first threshold value, and determine in operation S1207 whether the maximum values of the first and second power is larger than a second threshold value. In operation S1209, the algorithm generator may fix and store a power scheduling algorithm only when operations 1203, 1205, and 1207 are satisfied, and may again perform the scheduling when any of operations 1203, 1205, and 1207 are not satisfied. Here, the first threshold value may be power through which, for example, a single antenna generates a specific SAR value, for example, 0.3 mW/g. The second threshold value may be power through which a single antenna generates a transmission single having specific strength.

The power scheduling algorithm stored by the algorithm generator, for example, may be stored in a storage unit of the mobile communication terminal at a time of manufacturing the mobile communication terminal, or may be downloaded onto the mobile communication terminal and stored in the storage unit of the mobile communication terminal.

Figure 12B:
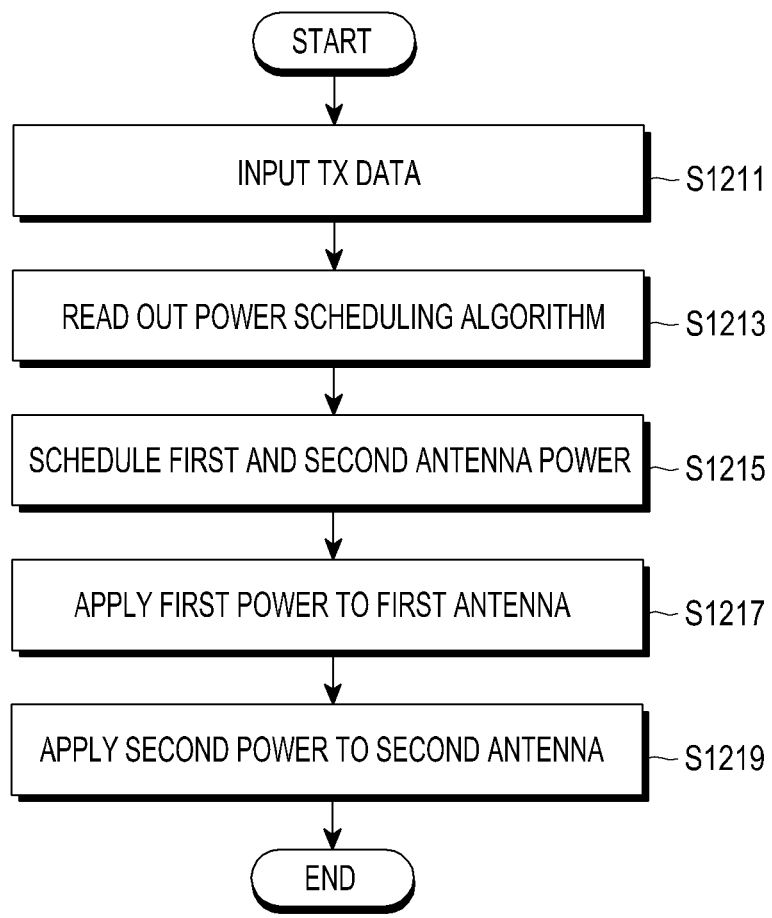
FIG. 12B is a flowchart illustrating a control method of a mobile communication terminal according to an embodiment of the present disclosure.

FIG. 12B is a flowchart illustrating a control method of a mobile communication terminal according to an embodiment of the present disclosure.

Referring to FIG. 12B, the mobile communication terminal may receive transmission data in operation S1211. The mobile communication terminal may read out a power scheduling algorithm stored in a storage unit thereof in operation 1213, and may schedule power which will be applied to first and second antennas, based on the read power scheduling algorithm, in operation S1215. For example, the mobile communication terminal may read out the algorithm generated by the processes of FIG. 12A.

In addition, the mobile communication terminal may apply first power and second power to the first antenna and the second antenna, respectively, in operations 1217 and 1219. For example, the mobile communication terminal may apply the first and second power based on the algorithm generated by the process of FIG. 12A. Thus, the first and second power may be smaller than a first threshold value and a sum of the first and second power may exceed a second threshold value.

It may be appreciated that various embodiments of the present disclosure can be implemented in software, hardware, or a combination thereof Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. Also, it will be appreciated that various embodiments of the present disclosure may be implemented by a computer or a portable terminal which includes a control unit and a memory, in which the memory may be an example of a storage medium that is readable by a machine that is suitable for storing one or more programs that include instructions for implementing various embodiments of the present disclosure. Accordingly, the present disclosure includes a program for a code implementing the apparatus and method described in the appended claims of the specification and a machine (a computer or the like)-readable storage medium for storing the program.

Further, the device can receive the program from a program providing apparatus connected to the device wirelessly or through a wire and store the received program. The program supply apparatus may include a program that includes instructions to execute various embodiments of the present disclosure, a memory that stores information or the like required for various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a mobile communication terminal comprising a first antenna and a second antenna, the method comprising:
   receiving transmission data to be transmitted;
   applying first power to the first antenna;
   applying second power to the second antenna;
   cooperatively transmitting the transmission data based on the first power and the second power, respectively, by the first antenna and the second antenna;
   determining whether the first power is smaller than a first predetermined power value, the first predetermined power value being associated with a predetermined specific absorption rate (SAR) value;
   scheduling, when the first power is larger than or equal to the first predetermined power value, the first power to be smaller than the first predetermined power value;
   determining whether the second power is smaller than the first predetermined power value; and
   scheduling, when the second power is larger than or equal to the first predetermined power value; the second power to be smaller than the first predetermined power value,
   wherein a sum of the first power and the second power is larger than a second predetermined power value.

2. The method of claim 1, wherein the second predetermined power value is a power value for generating a value of transmission signal strength when the power is applied to a single antenna.

3. The method of claim 1,
   wherein the applying of the first power to the first antenna comprises applying a value of power scheduled to be smaller than the first predetermined power value, and
   wherein the first predetermined power value is associated with a predetermined SAR value.

4. The method of claim 1,
   wherein the applying of the second power to the second antenna comprises applying a value of power scheduled to be smaller than the first predetermined power value, and
   wherein the first predetermined power value is associated with a predetermined SAR value.

5. The method of claim 1,
   wherein the applying of the first power to the first antenna comprises applying time dependent power scheduled to be having a maximum value smaller than the first predetermined power value, and
   wherein the first predetermined power value is associated with a predetermined SAR value.

6. The method of claim 5,
   wherein the applying of the second power to the second antenna comprises applying time dependent power scheduled to be a maximum value smaller than the first predetermined power value, and
   wherein the first predetermined power value is associated with a predetermined SAR value.

7. A mobile communication terminal for transmitting a transmission signal to an outside, the mobile communication terminal comprising:
   a first antenna and a second antenna configured to cooperatively transmit the transmission signal;
   a control chip configured to:
     receive transmission data to be transmitted,
     apply first power to the first antenna, and
     apply second power to the second antenna;
   a transceiver configured to:
     receive the transmission data from the control chip, and
     amplify the received transmission data; and
   a first modulator and a second modulator configured to:
     modulate the transmission data input from the transceiver, and
     output the modulated transmission data to the first antenna and the second antenna, respectively,
   wherein the control chip is further configured to:
     determine whether the first power is smaller than a first predetermined power value, the first predetermined power value being associated with a predetermined specific absorption rate (SAR) value,
     schedule, when the first power is larger than or equal to the first predetermined power value, the first power to be smaller than the first predetermined power value,
     determine whether the second power is smaller than the first predetermined power value, and schedule, when the second power is larger than or equal to the first predetermined power value, the second power to be smaller than the first predetermined power value, and wherein a sum of the first power and the second power is larger than a second predetermined power value.

8. The mobile communication terminal of claim 7, wherein the second predetermined power value is a power value for generating a value of transmission signal strength when the power is applied to a single antenna.

9. The mobile communication terminal of claim 7, wherein the control chip is further configured to apply the first power scheduled to the first antenna by applying a value of power smaller than the first predetermined power value, and wherein the first predetermined power value is associated with a predetermined SAR value.

10. The mobile communication terminal of claim 7, wherein the control chip is further configured to apply the second power scheduled to the second antenna by applying a value of power smaller than the first predetermined power value, and wherein the first predetermined power value is associated with a predetermined SAR value.

11. The mobile communication terminal of claim 7, wherein the control chip is further configured to apply the first power scheduled to the first antenna by applying time dependent power smaller than the first predetermined power value, and wherein the first predetermined power value is associated with a predetermined SAR value.

12. The mobile communication terminal of claim 11, wherein the control chip is further configured to apply the second power scheduled to the second antenna by applying time dependent power smaller than the first predetermined power value, and wherein the first predetermined power value is associated with a predetermined SAR value.

13. A method of controlling a mobile communication terminal comprising a plurality of antennas, the method comprising:

receiving transmission data to be transmitted;

applying power scheduled to be smaller than a first predetermined power value, the first predetermined power value being associated with a predetermined specific absorption rate (SAR) value to the plurality of antennas;

cooperatively transmitting, by the plurality of antennas, the transmission data based on the power applied to the plurality of antennas;

determining whether respective power applied to each of the plurality of antennas is smaller than the first predetermined power value; and scheduling, when the respective power applied to each of the plurality of antennas is larger than or equal to the first predetermined power value, the respective power applied to each of the plurality of antennas to be smaller than the first predetermined power value, wherein a sum of the power applied to the plurality of antennas is scheduled to be larger than a second predetermined power value.

14. The method of claim 13, wherein the second predetermined power value is a power value of a power for generating a value of transmission signal strength when the power is applied to a single antenna.

15. A non-transitory computer readable medium for storing an algorithm for scheduling of power applied to a plurality of antennas, wherein the algorithm comprises:

receiving transmission data to be transmitted;

applying power scheduled to be smaller than a first predetermined power value, the first predetermined power value being associated with a predetermined specific absorption rate (SAR) value to the plurality of antennas;

cooperatively transmitting, by the plurality of antennas, the transmission data based on the power applied to the plurality of antennas;

determining whether respective power applied to each of the plurality of antennas is smaller than the first predetermined power value; and scheduling, when the respective power applied to each of the plurality of antennas is larger than or equal to the first predetermined power value, the respective power applied to each of the plurality of antennas to be smaller than the first predetermined power value, wherein a sum of the power applied to the plurality of antennas is scheduled to be larger than a second predetermined power value.

16. The non-transitory computer readable medium of claim 15, wherein the second predetermined power value is a power value of a power for generating a value of transmission signal strength when the power is applied to a single antenna.

* * * * *